United States Patent [19]
Müller

[11] 3,991,864
[45] Nov. 16, 1976

[54] MOTOR SAW, ESPECIALLY MOTOR CHAIN SAW

[75] Inventor: Erich Müller, Hegnach, Germany

[73] Assignee: Andreas Stihl Maschinenfabrik, Neustadt, Germany

[22] Filed: Oct. 24, 1974

[21] Appl. No.: 517,800

[30] Foreign Application Priority Data
Oct. 25, 1973 Germany............................ 2353479

[52] U.S. Cl. ...................... 192/105 BA; 192/67 R; 192/12 R; 30/381; 30/383
[51] Int. Cl.² .................. F16D 23/10; B23D 57/02
[58] Field of Search .......... 192/105 BA, 67 R, 48.3, 192/12; 30/383, 381

[56] References Cited
UNITED STATES PATENTS

| | | | |
|---|---|---|---|
| 2,675,833 | 4/1954 | Kiekhaefer ......................... | 192/67 R |
| 3,776,331 | 12/1973 | Gustafsson ........................... | 30/381 |
| 3,785,465 | 1/1974 | Johansson ..................... | 192/105 BD |
| 3,839,795 | 10/1974 | Dooley................................. | 30/383 |
| 3,857,180 | 12/1974 | Dooley................................. | 30/383 |

Primary Examiner—Samuel Scott
Assistant Examiner—Randall Heald
Attorney, Agent, or Firm—Walter Becker

[57] ABSTRACT

A clutch arrangement for a motor driven chain saw having a first clutch element driven by the motor shaft and a second clutch element normally engaged with the first clutch element but disengageable therefrom and a centrifugal clutch between the second clutch element and the drive sprocket for the saw chain. The second clutch element includes a spring disc and is axially yieldable between clutch engaged and clutch disengaged positions. A lever is provided moveable for disengaging the clutch elements and a brake member connected to the lever is operable for braking the drive sprocket when the clutch elements are disengaged.

30 Claims, 8 Drawing Figures

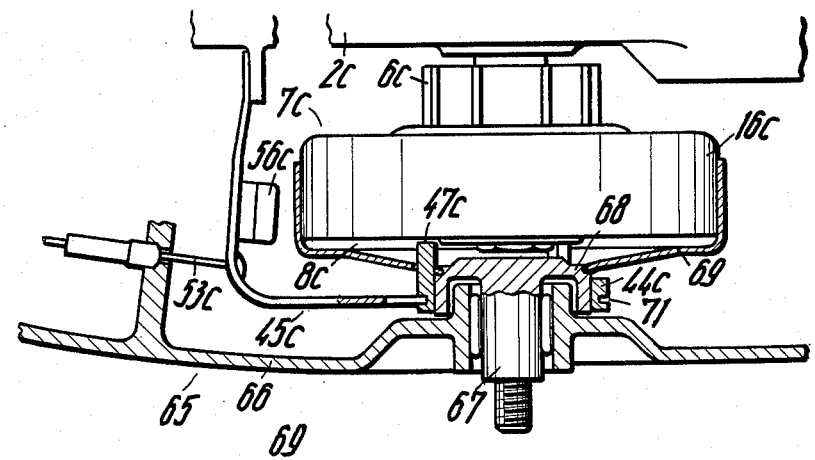
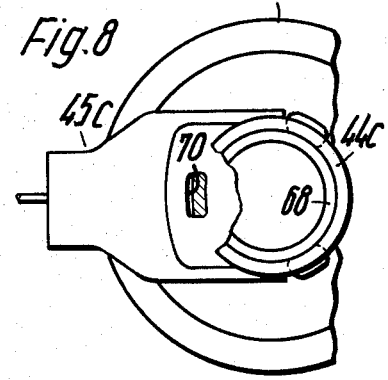
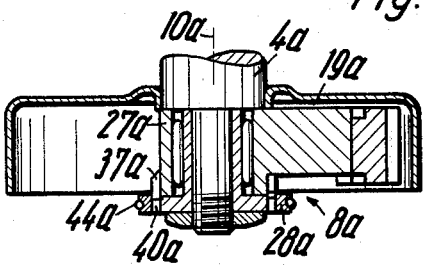
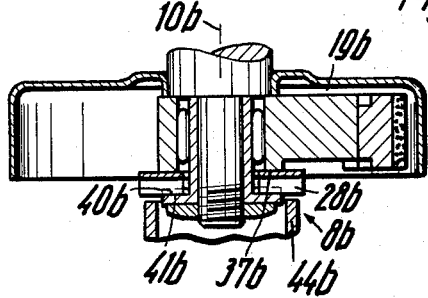
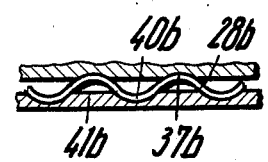

MOTOR SAW, ESPECIALLY MOTOR CHAIN SAW

The present invention relates to motor saws, especially motor chain saws, with a driving sprocket for the saw chain, which sprocket is adapted to be driven by a motor through the intervention of an intermediate coupling acting as a safety coupling. The intermediate coupling is adapted to be disengaged by means of an actuating element through the intervention of a release member mounted on the housing and, comprises at least one follower element movable between a disengaging and an engaging position for connecting the two coupling parts of the intermediate coupling.

It is an object of the present invention to so design a motor saw of the above mentioned general type that in spite of a simple and relatively light construction, a safe functioning of the intermediate coupling will be assured. This object and other objects and advantages of the invention will appear more clearly from the following specification in connection with the accompanying drawings, in which.

Figure 2:
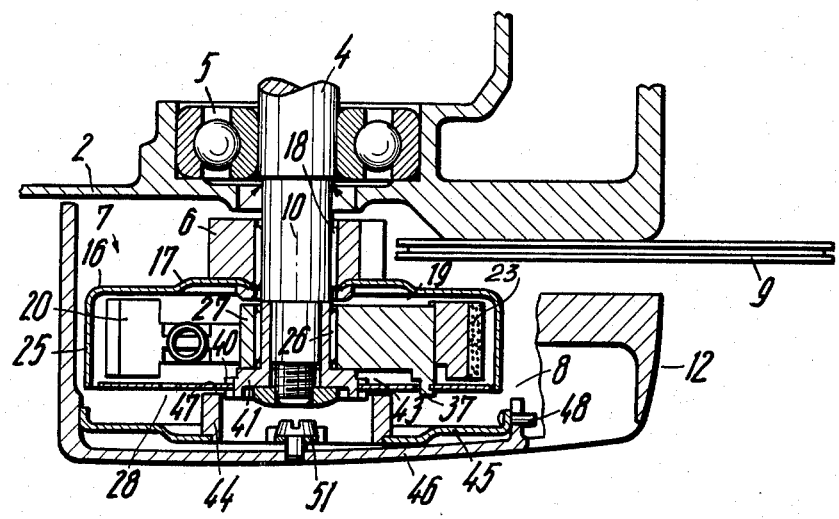
FIG. 2 represents a section taken along the line II—II of FIG. 1.

FIGS. 4 and 5 respectively illustrate two additional modifications of the arrangement shown in FIG. 2.

FIG. 6 is a cutout of FIG. 5 and shows a development thereof.

FIG. 7 is a further modification of the arrangement of FIG. 2.

FIG. 8 is a cutout of FIG. 7 and more specifically illustrates an axial view.

The motor saw according to the present invention which is provided with a driving sprocket for the saw chain which driving sprocket is adapted to be driven by a motor through an intermediate coupling representing a safety coupling, and in which the intermediate coupling that is adapted to be disengaged by an actuating element through the intervention of a relay member, comprises at least a follower element movable between a disengaging and engaging position for connecting the two coupling parts of the intermediate coupling, is characterized primarily in that the disengaging and engaging movement of the follower element is directed substantially in the axial direction of the intermediate coupling.

Such following member can with a frictional or positive engagement with the respective coupling part be shifted by considerably simpler means and considerably faster than is the case for instance with a follower member which is to be shifted in circumferential or radial direction, and furthermore can be so designed that considerable space will be saved.

When the follower element is in disengageable engagement with the coupling part on the driving side, the follower member may in an advantageous manner stand still while the intermediate coupling is disengaged, and while only the coupling part on the driving side rotates. In this way, also the follower element can be arrested in its disengaged position in a simple manner because in this position it does not carry out any relative movements with regard to the release member.

For safely holding the follower member, the latter is, however, mounted on a coupling part, preferably on the output side and/or on a coupling part having the greater diameter so that a disengagement relative to the coupling part is not necessary in disengaged position. Instead the follower member remains connected to said coupling member in a positive rotating position.

The two coupling parts may in a simple manner be mounted rotatably against each other while preferably that coupling part which carries the follower element is in a space-saving manner mounted on a shaft of the other coupling part for instance by means of a needle bearing.

For further simplifiying the means for shifting the follower member, the latter is spring urged toward a position, preferably for engagement so that the follower member has to be moved only in the opposite direction with the release member and will safely return to the other position namely especially to the engaging position.

In order to be able in spite of a relatively light construction, to transmit very high torques, the follower member is in engaged position connected to at least one coupling in particular, and especially is positively connected to both connecting parts.

For instance, the follower member may engage at least one coupling part through the intervention of teeth in the manner of a splined shaft. This engagement is provided especially with regard to the coupling part which is disengageably connected to the follower element, because such teeth permit a nearly stepless and thus very fast engagement in which a very space-saving design can also be realized when the follower element is located in the axis of the coupling and forms a disc so that less axial space is required.

Advantageously, the follower element is by at least one spring arranged toward a position. A safer hold of the follower element in spite of a simple construction will be assured for instance by mounting the follower element with extensions engaging openings, on a coupling part while the openings are preferably provided on the follower element so that the latter can in a simple manner as plug element or by plug connections be connected to the coupling part and can equally easily axially be disengaged again whenever a repair should call for it.

Figure 1:
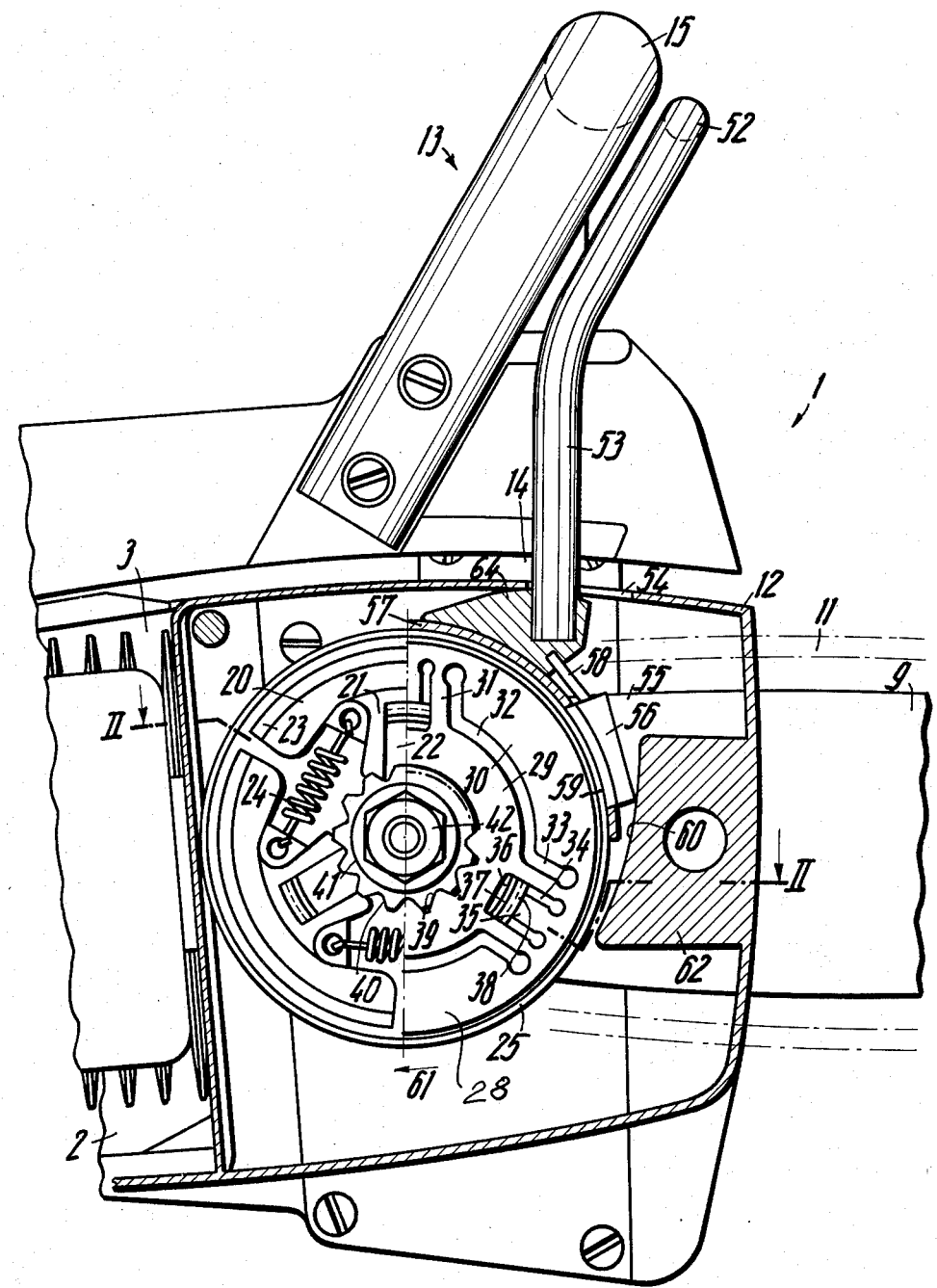
FIG. 1 represents a cutout of a motor chain saw according to the invention and shows the latter partially sectioned.
Figure 3:
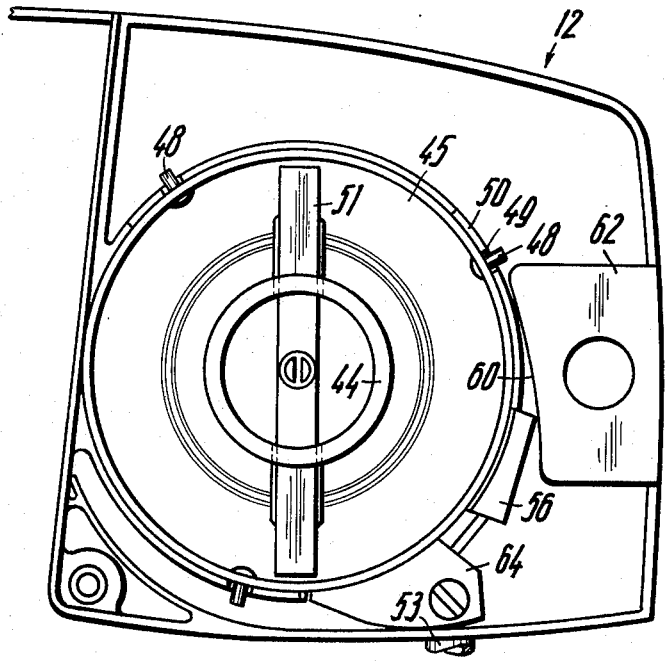
FIG. 3 shows the housing cover according to FIG. 2 and more specifically represents a view of the inside thereof.

Referring now to the drawings in detail, it will be seen from FIGS. 1–3 that a motor chain saw 1 according to the invention comprises a housing 2 for receiving a one-cylinder engine 3 in lying position. The crankshaft 4 of motor 3 extends out of one housing side of housing 2 and at this housing side is by a bearing 5 mounted similar to the manner in which it is mounted on the other housing side. Outside said housing and directly adjacent thereto, a driving sprocket wheel 6 is provided on the crankshaft 4. The sprocket wheel is adapted frictionally to be connected to the crankshaft 4 through a centrifugal clutch 7 located on that side which faces away from the housing 2 and through a safety coupling 8. In alignment with the driving sprocket wheel 6 and to the pertaining side of housing 3 there is connected guiding rail 9 for a saw chain 11 which is indicated in FIG. 1 by dot-dash lines and extends around the driving sprocket 6. The guiding rail 9 extends nearly up to the driving sprocket wheel 6. The saw chain 11 is located at a right angle with regard to the axis of rotation of the driving sprocket wheel 6 and freely projects beyond the front end of the housing 2. The axis of rotation of the driving sprocket wheel 6 simultaneously forms the coupling axis of the couplings. The driving chain sprocket 6 as well as the couplings are covered toward the outside by a housing cover 12 which is disengageably connected to the housing 2. The housing cover 12 leaves at the front side of the housing 2 a gap for the passage of the guiding rail 9. At the topside of housing 2 above the crankshaft 4 there is provided a front holding handle 13 which forms one structural part together with a rear holding handle located behind the rear end of housing 2 and not illustrated further. This structural part is connected to the topside of housing 2 through the intervention of oscillation cushioning bearing 14. The front holding handle 13 is shaped in the manner of a yoke and includes a section 15 which is slightly offset toward the front relative to the crankshaft 4 and extends in a transverse direction above the topside of the housing 2. One of the downwardly extending legs of the front holding handle 13 is directly above the couplings 7 and 8 and is rigidly connected to the above mentioned handle-structural unit, whereas the other leg is connected by means of a further oscillation cushioning bearing to that side of the housing 2 which faces away from said handle-structural unit.

The driving chain sprocket 6 forms a structural element which is mechanically rigidly connected to a clutch drum 16 of the centrifugal clutch 7 the end face 17 of which is in the radial inner range connected to the driving sprocket wheel 6 which has a considerably smaller diameter than said drum 16. The sprocket wheel 6 and the clutch drum 16 are by means of a needle bearing 18 rotatably journalled on the crankshaft 4. In the clutch drum 16 there is located a star-shaped carrier 19 for three centrifugal weights 20 which are uniformly distributed about the clutch axis 10, said carrier 19 forming a central body. The centrifugal weights 20 are annular segment shaped and arranged around the clutch axis 10. The centrifugal weights 20 are equipped with shoes 21 which extend on both sides over the arms 22 of the carrier 9 in such a way that said arms are radially displaceable with regard to the clutch axis 10 relative to the carrier 19. Adjacent centrifugal weights 20 having their outer circumferential surfaces provided with friction liners 23 are by means of helical springs 24 which are tengential with regard to the clutch axis 10 connected to each other in such a way that the centrifugal weights are spring urged inwardly toward the clutch axis 10, in other words to their disengaging position. The friction surfaces of the centrifugal weights 20 have as countersurface associated therewith the inner surface of the cylinder mantle shaped section 25 of the clutch drum 16. This inner surface is above a certain speed of the carrier 19 engaged by the centrifugal weights 20 against the thrust of springs 24 whereby the clutch drum 16 as well as the driving sprocket wheel 6 are taken along. The carrier 19 is by means of a needle bearing 26 rotatably journalled on the crankshaft 4 directly adjacent to that end face of the sprocket wheel 6 which faces said carrier 19 and is located within the clutch drum 16. The carrier 19 comprises a hub 27 which surrounds the crankshaft 4 and receives the needle bearing 26 while the arms 22 of the star-shaped carrier 19 radially project from said hub 27.

The intermediate coupling 8 is designed as positive clutch and includes a follower member 28 in the form of a resilient disc which is connected to the carrier 19 for the centrifugal weights 20 which carrier 19 is provided on that clutch part which is located on the output side. In FIG. 1 on the lefthand section of the clutches, this follower member 28 covering the centrifugal forces 20 is for the sake of clarity not illustrated. The follower member 28 comprises an inner annular engaging zone 29 and an outer engaging zone 30 which is likewise substantially annular. These two engaging zones 29 and 30 are connected to each other by means of radially extending transverse webs 31 of relatively small cross section and are separated from each other by slots 32 which are uniformly distributed around the clutch axis 10 and have the shape of partial rings.

Those ends of adjacent slots 32 which face each other extend outwardly and thus respectively form a lateral edge of transverse web 31. On the other side of each transverse web 31 there is provided an additional slot 34 which is parallel to the pertaining slot end 33 and has approximately the same length. Two such parallel slots 34 each are symmetrically located between two slot ends 33 or the transverse webs 31 parallel thereto and are so located that the slot ends 33 and the slots 34 are symmetrical to an axial plane of the clutch axis 10 which axial plane is symmetrically located between said slots 34.

Between adjacent slots 34 there is respectively formed a holding member 35 which projects inwardly toward the clutch axis 10. The holding member 35 has the form of a tongue-shaped link the radial inner edge of which is located approximately on the inner diameter of the outer engagement zone 30 of the follower element 28. On the inner edge of the respective holding member 35 of which likewise three are uniformly distributed around the circumference, the follower member 28 has arranged therein an opening 36 in the form of a perforation, the parallel lateral surfaces of which are spaced from each other by a distance which equals the width of the arms 22 and which in the rectilinear manner merge with those lateral edges of the two pertaining slots 34 which are located further from each other, so that the holding member 35 is narrower than the respective pertaining arm 22. Each arm 22 has its radial outer end provided with an axially protruding partial ring-shaped extension 37 which is curved around the clutch axis 10 and which has the same width as the pertaining arm 22 or the openings 36 and engages a pertaining opening 36.

On that outer circumferential surface which faces away from the clutch axis 10, each extension 37 comprising an arresting opening in the form of for instance an annular groove 38 which extends about the clutch axis 10 over its entire width. The holding member 35 is adapted resiliently to engage said annular groove 38 so that the follower member 28 will in the axial direction of the clutch axis 10 be safely connected to the carrier 1. The follower member 28 will then completely be located within the clutch drum 16. The follower member 28 will, however, not contact the centrifugal weights 20 because the lateral surfaces of said weights 20 which face the follower member 28 are slightly set back relative to the follower member 28. The outer diameter of the follower member 28 is only slightly smaller than the inner diameter of the clutch drum 16.

The inner likewise substantially annular engagement zone 29 of the follower member or element 28 has its inner circumference countermember 39 for shaft teeth 40, said countermember 39 being formed by inner teeth. The teeth 40 are provided on the outer circumference of a hub disc. The hub disc 41 is positive rotatably and axially secured by means of a nut 42 on a threaded extension which is provided on the outer end of the crankshaft 4 and has a threaded extension reduced in diameter. The hub disc 41 has that side thereof which faces the carrier 19, adjacent to the teeth 40 of the shaft provided with a section that is reduced in diameter to such an extent that an annular groove-like depression 43 is formed. The inner diameter of groove 43 is less than the base diameter of the teeth 40 and the width of said depression 43 is greater than the thickness of the follower member 28 at least within the region of the countermember 39. In this connection, a lateral surface of this depression 43 is formed by the teeth and the other lateral surface is formed by the pertaining end face of hub 27 of the carrier 19. Due to the fact that the inner engagement zone 29 of the follower member 28 is merely through through transverse webs 31 connected to the outer engagement zone 30, it is possible to move the inner engagement zone 29 relative to the outer engagement zone 20 in an axially resilient manner. In engaged position according to FIGS. 1 and 2 the engaging zones 29, 30 are located coaxially to each other in a common plane.

From this engaging position, the inner engagement zone 29 may be moved axially against the carrier 19 or in the direction to the depression 43 forming a free wheel zone, relative to the outer engagement zone 30 so that the counterelement 39 will disengage the teeth 40 and will be located within the region of the depression 43. In this position, the positive engagement between follower element 28 and crankshaft 4 no longer exists which means that the intermediate clutch 8 is disengaged and the crankshaft 4 can rotate without taking along the carrier 19. In this connection, the inner engagement zone 29 may be supported at that end face of the hub 27 and arms 22 which face toward the engagement zone 29. The spring characteristic of the spring formed by the follower element 28 which tends to return the inner engagement zone to the engaging position, is expeniently so selected that the counterelement 39 can only below a predetermined maximum speed, for instance at an idling speed engage the teeth 40 due to the thrust of the spring so that therefore only below this speed and not at random at any speed, an engagement of the safety clutch 8 will be possible.

For purposes of actuating the follower member 28 there is provided a sleeve-shaped release member 44 which is located along the clutch axis 10 and which by means of an annular disc shaped carrier 45 is mounted on the inner side of the cover wall 46 of the housing cover 12, said cover wall 46 extending in a direction transverse to the clutch axis 10. The inner end face 47 of the release member 44 is arranged directly adjacent to that end face of the inner engagement zone 29 of the follower member 28 which faces said release member 44. The inner diameter of the release member 44 is only slightly greater than that of the hub disc 41 so that the latter will be able to engage the release member 44, whereas the outer diameter of the release member 44 is shorter than the inner engagement zone 29 of the follower member 28. The outer circumference of the carrier 45 has provided thereon three cams 48 which are substantially uniformly distributed about the clutch axis 10 and project radially outwardly. These cams 48 may be formed for instance by pins which have those sides thereof that point away from the end surface 47 rest against identical bends extending about the clutch axis 10. These bends form ascending elements 49 (Steigungslieder), which ascend in the direction of the clutch axis 10 at least by the disengaging stroke of the inner engagement zone 29 of the follower 28 plus the distance of the end face 47 from the engaging surface of the follower member. If the carrier 45 is turned around the clutch axis 10, the ascending elements 49 will bring about an axial movement of the release member 44, which axial movement is directed against the follower member 28. Adjacent said members 49 there are provided ascent-free bent sections 50 which are located in a plane that extends at a right angle to the clutch axis 10 so that when the cams 48 reach these bent sections 50, the release member 44 is arrested in the described disengaging position but can be turned further. The bent sections may be provided on a protruding annular web on the inner side of the cover wall 46, said annular web simultaneously serving for rotatably and axially displaceably mounting the carrier 45 and release member 44. The release member 44 and carrier 45 are by means of a spring 51 which may be a bending or leaf spring, urged away from the follower member 28 in such a way that the cam members 48 due to the thrust of the spring engage the bent sections and members 49. The spring 51 is located diametrically with regard to the release member 44 and is connected along the clutch axis 10 by means of a bolt or the like to the clutch cover 12. The ends of said spring 51 which are passed through oppositely located windows in the release member 44 and extend to the inner end face of the carrier 45 against which they rest resiliently. With a corresponding design of this spring 51, for instance in longitudinal direction as a pressure rod, a snap or arresting effect of the release member 44 can be reached at least in one position, especially in the disengaging position. Connected to the carrier 5 by means of a holder 64, a handle 52 with an angle arm 53 is mechanically rigidly connected. The arm 53 extends upwardly through an opening 54 in the upper rear wall of the housing cover 12, and the handle 52 extends parallelly with regard to the handle section 15 of the front holding handle 13 directly adjacent to the front side of the latter when the release member 44 occupies its engaging position in conformity with FIGS. 1 and 2. The handle section 15 and the handle 52 have thus to be grasped together by one hand when the safety clutch 8 is to be engaged. The release member 44 is in the corresponding direction of rotation, expediently by means of a nonillustrated spring urged toward the disengaging position so that when letting the handle 52 go, the release member 44 immediately moves to disengaging position. In the engaging position, the release member 44 may be limited for instance by the holder 51 abutting the inner side of the marginal wall of the housing cover 12. The opening 54 may likewise be designed as cam or as coulisse the lateral edges of which are inclined in such a way that when pivoting the handle 52 said lateral edges convey onto the handle 52. Axial forces in the direction of the disengaging movement of the release member 44 and/or that the angle arm 53 is held arrested in one position, especially in the disengaging position.

The safety device according to the invention furthermore comprises a braking device 54 the brake member 56 of which is rotatable together with the release member 44 and is mounted on the carrier 45. The brake member 56 has its brake lining below the holder 51 on the front side of the clutch drum 16 engage the outer circumference of the cylinder mantle section 25 of said drum while the brake member 56 extends through a window into a rim mantle 57 which has the form of a partial ring and which is provided on the carrier 45, and extends over the clutch drum 16 at the outer circumference thereof in slightly spaced relationship thereto. The brake member 56 is for purposes of movability in a direction transverse to the clutch axis 10 or transverse to the countersurface of the clutch drum 16 connected by means of a flexible connecting element 58 which in the specific illustrated example is connected to the holder 51. Expediently, the braking member 56 is spring urged toward disengaging position, in other words away from the clutch axis 10. To this end the connecting member 58 may be resiliently designed. On that side of the braking member 56 which faces away from the brake surface 59, on the housing cover 12 and thus fixedly connected to the housing there is provided a concavely curved wedge surface 60. This wedge surface 60 is in the rotary working direction (arrow 61) of the clutch drum 16 and in downwardly direction approaches the outer circumference of the clutch drum, said brake member 56 being guided on said wedge surface 60. In the specific embodiment shown, the wedge surface 60 is provided on an eye-shaped extension 62 located in the housing cover 12. The extension 62 has a passage for a connecting screw for detachably connecting the housing cover to the housing 2.

When the release member 22 for disengaging the safety clutch 8 is turned in the described manner in working direction (arrow 61) of the clutch drum 16, simultaneously the brake member 56 is immediately after reaching the disengaging position moved by the release member 44 against the wedge surface 60. The release member 44 will then due to the bent sections 50 no longer carry out an axial movement but during a further rotation the brake member 56 will stronger and stronger be pressed against the clutch drum 16. As a result thereof, the clutch drum 16 is, following the disengagement of the safety clutch 8 including the driving sprocket wheel 6 and saw chain 11, stopped immediately. Instead of designing the follower member 28 as a spring, it is also possible in addition thereto for spring loading the follower member 28, especially the inner engagement zone 29, to provide at least a separate spring while, for instance in an axis parallel manner with regard to the clutch axis 10 pressure springs may be arranged in bores of the arms 22. These pressure springs may rest against that end face of the follower member 28 which faces away from the release member 44 or on that end face of the follower member 28 which faces away from the disengageable engagement zone 29.

In FIGS. 4–8, those parts which correspond to the parts of FIGS. 1–3, are designated with the same reference numerals as used in FIGS. 1–3 but in FIG. 4 are designated with the additional index *a* and in FIGS. 5 and 6 are designated with the additional index *b* and in FIGS. 7 and 8 are designated with the additional index *c*.

With the embodiment of FIG. 4, the follower member 28*a* of the safety clutch 8*a* is formed by for instance an annular shifting sleeve the engaging zones of which are located adjacent to each other in the direction of clutch axis 10*a* and are formed by inner teeth which extend through the axial extension of the follower member 28*a*. These inner teeth, in engaging position, mesh with the teeth 40*a* of the crankshaft 4*a* and also with similar teeth 37 of the shaft which is axially adjacent to the teeth 40*a*, said teeth 37*a* located on a protruding sleeve extension of the hub 27*a* of the clutch part 19*a* on the output side. The axial extension of the follower member 28*a* or of the inner teeth thereof is at a maximum as long as the axial extension of the teeth 37*a* so that by an axial displacement, the follower member 28*a* can be completely moved into the region of the teeth 37*a* and will disengage the teeth 40*a*. On the outer circmference of this follower member 28*a* which itself is non-resilient and the outer diameter of which is considerably shorter than that of the carrier 19*a*, there is provided in an annular groove a control spring wire 44*a* or the like by means of which the follower member 28*a* can be moved by the release member. According to the embodiment of FIGS. 5 and 6, the follower member 28*a* is formed by an annular undulated spring which in circumferential direction is so undulated that the longitudinal axes of its undulations are approximately radial with regard to the clutch axis 10*b*. The two clutch parts 19*b*, 41*b* of the safety clutch 8*b* are provided on end faces which face each other and have approximately the same diameter and are equipped with teeth 37*b*, 40*b* the form and shape of which corresponds to the undulations of the follower member 8*b* and which are slightly axially spaced from each other. The teeth 37*b* on the carrier 19*b* are provided on the end face of a protruding sleeve-shaped extension of the hub therefor, and the teeth 40*b* of the hub body 41*b* are provided on the inner end face of a protruding annular collar in such a way that the engaging zones of the follower member 28*b* will also with this embodiment in axial direction be arranged adjacent to each other. The follower member 28*b* projects with an outer annular rim beyond the outer circumference of the teeth while this protruding annular rim is provided for engaging the release member 44*b* is pressed axially against the follower member 28*b*, its corresponding undulations disengage the teeth 40*b* of the hub body 41*b* so that the safety clutch 4*b* is disengaged.

With the further development illustrated in FIGS. 7 and 8, the motor saw or the driving unit therefor is provided for the operation of an auxiliary device 65 which may for instance be formed by a hedge trimmer or any other motor operable tool and which is adapted exchangeably or detachably to be connected to the housing of the driving unit, by means of a for instance housing shaped carrier 66. Rotatably journalled on the carrier 66 by means of a needle bearing, is a working shaft 67 which for purposes of being connected to the tool to be driven is likewise mounted on the carrier 66, comprises for instance at the end of said shaft 67 a threaded extension. At one end, the shaft 67 is provided with a sleeve having connected thereto a drum 69 located along the axis of the working shaft 67. The drum 69 may be so placed on the clutch drum 16*c* in such a way that said drum is in its direction of rotation positively or at least frictionally connected to said coupling drum 16*c*. In this way, also the working shaft 67 of the auxiliary device 65 will through the intervention of said clutches be driven by the clutch drum 16*c*. Axially displaceably mounted on the outer circumference of the sleeve 68 is a sleeve-shaped release member 44*c* which by means of three release cams axially protruding relative to the clutch drum 16 and uniformly distributed about its axis extends through openings 70 in the end face wall of drum 69. The end surfaces of release cams form the axial pressure surface 47*c* for actuating the follower member in said clutch drum 16c. A circumferential groove 71 located outside the drum 69 and pertaining to the release member 44c which rotates together with the drum 69 or the clutch drum 16c, is engaged by the fork-shaped end of a release part 45c on to diametrically oppositely located zones in such a way that the release member 44c can be turned relative to said release part 45c about its axis but is axially positively connected to the release part 45c. The release part 45c is angled off adjacent to its fork-shaped end and is connected to the angled off end on the carrier 65 or on the housing 2c. The release part 45c is shown in FIG. 7 in its engaging position and is preloaded so as to be urged toward the disengaging position. Between the fastened end and the release member 44c, the release part 45c has linked thereto a Bowden wire 53c in such a way that by pulling the Bowden wire, the release member 44c is moved into engaging position according to FIG. 7 and, by releasing the Bowden wire it is moved into disengagement position in which the intermediate clutch or the follower thereof is disengaged. The Bowden wire 53 may be coupled to the front hand protection of the machine or advantageously to a gas lever blocking means or to the gas lever of the driving engine. However, it is also possible to provide for the Bowden wire 53c a separate activating lever forming the actuating element. For purposes of actuating the release member 44, it is possible instead of the release part 40c also to employ an arrangement according to FIG. 2 with ascending elements. As is shown in FIGS. 7 and 8, it is possible in view of the design according to the invention to mount additional devices such as cutting-off devices, edge trimmers, or the like without effecting any great alterations in the driving unit. These addditional auxiliary devices may likewise be controlled through the intervention of the safety clutch. According to the embodiment of FIGS. 1–3 and also according to the embodiment of FIGS. 7 and 8, the brake may be also differently designed for instance in the form of a multi-jaw brake, band brake, cone brake, or any other brake arrangement.

The design according to the present invention will make it possible in spite of a simple construction and assembly, that only a few non-complicated structural elements are required. The device is furthermore applicable for inwardly as well as outwardly arranged sprocket wheels and can easily be serviced. Most of the structural elements of the safety clutch may be so designed that they can be employed for different machines while also in a very simple manner a later attachment of already existing machines is possible. The design according to the invention is non-sensitive against offset centers with tolerances between the release member and the axis of the crankshaft. In adl conditions of operation, a complete symmetric effect of all rotatable bodies is possible so that no unbalance or vibration problems will occur. If any faults in the material should be encountered, no throwing out of major defect parts will occur so that the danger of accidents is greatly reduced. The design according to the present invention also permits a very light construction and a small overall width in axial direction. By correspondingly designing the follower member, the clutch may be covered against soil and oil by completely closing the open side of the clutch drum by the follower. A protection is also possible by having the carrier 45 according to FIG. 2 substantially completely and at low radial distance extend around the clutch drum 16 at the outer circumference thereof so that a shrouding of the brake surface against oil and saw chips will be possible.

It is, of course, to be understood that the present invention is, by no means, limited to the specific showing in the drawings but also comprises any modifications within the scope of the appended claims.

What is claimed is:

1. In a motor driven chain saw having a chain drive socket adapted for being driven by the output shaft of the saw motor, a clutch having one element connected to the motor shaft and another element for driving the sprocket, said clutch elements being normally in driving engagement, and a follower member forming a part of one of said clutch elements and moveable in the axial direction of the motor shaft during engaging and disengaging of the said clutch elements, said follower member having internal means for positive connection thereon and the other clutch element having external means for positive connection engageable with said internal means for positive connection when the clutch is engaged.

2. A motor driven chain saw according to claim 1 which includes a release member moveable in the axial direction and engageable with said follower member for movement thereof between clutch engaged and clutch disengaged positions.

3. A motor driven chain saw according to claim 2 which includes axially facing interengageable pressure surfaces on said release member and follower member.

4. A motor driven chain saw according to claim 1 in which the said one clutch element of which said follower member forms a part is the output side of said clutch.

5. A motor driven chain saw according to claim 1 in which the said one clutch element of which said follower member forms a part is the output side of the said clutch, said one clutch element having a greater diameter than the other clutch element.

6. A motor driven chain saw according to claim 1 in which said one clutch element includes a second member connected to said follower member and journaled on the other said clutch element.

7. A motor driven chain saw according to claim 1 in which said follower member is spring biased toward clutch engaged position.

8. A motor driven chain saw according to claim 1 in which said clutch elements when in engaged position are positively interconnected.

9. A motor driven chain saw according to claim 1 in which said other clutch element has a groove formed therein axially adjacent the region of the teeth thereof which is engaged by the teeth of said follower member when the clutch is engaged, the teeth of said follower member being disposed in said groove when said clutch is disengaged.

10. A motor driven chain saw according to claim 1 in which said follower member is an axially resilient annular disc coaxial with the motor shaft.

11. A motor driven chain saw according to claim 1 in which said one clutch element includes a second member connected to said follower member, said second member supporting said follower member in a predetermined axial position.

12. A motor driven chain saw according to claim 2 in which said release member is coaxial with the motor shaft.

13. In a motor driven chain saw having a chain drive socket adapted for being driven by the output shaft of the saw motor, a clutch having one element connected to the motor shaft and another element for driving the sprocket, said clutch elements being normally in driving engagement, and a follower member forming a part of one of said clutch elements and moveable in the axial direction of the motor shaft during engaging and disengaging of the said clutch elements, said follower member being an axially resilient annular disc coaxial with the motor shaft, said disc having internal teeth, the other clutch element having external teeth engaged by the said internal teeth when the clutch is engaged, said one clutch element including a second member nonrotatably connected to said disc in a region thereof radially outwardly from the said internal teeth.

14. A motor driven chain saw according to claim 13 which includes apertures in said disc and said second member having lugs engaging said apertures.

15. In a motor driven chain saw having a chain drive socket adapted for being driven by the output shaft of the saw motor, a clutch having one element connected to the motor shaft and another element for driving the sprocket, said clutch elements being normally in driving engagement, and a follower member forming a part of one of said clutch elements and moveable in the axial direction of the motor shaft during engaging and disengaging of the said clutch elements, said follower member is an axially resilient annular disc coaxial with the motor shaft, said disc comprising annular slot means therein dividing the disc into an inner and outer region, said inner region having internal teeth, the other clutch element having external teeth engaged by the internal teeth when the clutch is engaged.

16. A motor driven chain saw according to claim 15 which includes radial webs resiliently connecting the inner and outer regions of said disc.

17. A motor driven chain saw according to claim 15 in which said disc is formed of spring material.

18. In a motor driven chain saw having a chain drive socket adapted for being driven by the output shaft of the saw motor, a clutch having one element connected to the motor shaft and another element for driving the sprocket, said clutch elements being normally in driving engagement, and a follower member forming a part of one of said clutch elements and moveable in the axial direction of the motor shaft during engaging and disengaging of the said clutch elements, said follower member being an internally toothed spring disc, the other clutch element having external teeth which engage the internal teeth when the clutch is engaged, said one clutch element comprising a second member rotatable on said other clutch element and connected to said spring disc radially outwardly from said internal teeth.

19. A motor driven chain saw according to claim 18 which includes clutch means carried by said second member and operable by centrifugal force to connect said second member to the chain drive sprocket.

20. A motor driven chain saw according to claim 19 in which said clutch means includes a drum surrounding said second member and follower member.

21. A motor driven chain saw according to claim 20 in which said drum is connected to the drive sprocket at one end of the drum, the other end of the drum being open, said follower member being disposed in the open end of the drum.

22. A motor driven chain saw according to claim 19 in which said clutch means includes weights moveably carried by said second member and moveable radially thereon.

23. A motor driven chain saw according to claim 12 in which said release member is a ring, and cam means for actuating said ring in axial movement to control the engagement and disengagement of said clutch, said ring being spring biased in clutch engaging direction.

24. A motor driven chain saw according to claim 23 which includes a housing member, said cam means comprising inclined surfaces on said housing member, and means engaging said inclined surfaces and connected to said ring.

25. A motor driven chain saw according to claim 21 which includes a brake member selectively engageable with said drum on the outside thereof.

26. In a motor driven chain saw having a chain drive socket adapted for being driven by the output shaft of the saw motor, a clutch having one element connected to the motor shaft and another element for driving the sprocket, said clutch elements being normally in driving engagement, and a follower member forming a part of one of said clutch elements and moveable in the axial direction of the motor shaft during engaging and disengaging of the said clutch elements, a release member moveable in the axial direction and engageable with said follower member for movement thereof between clutch engaged and clutch disengaged positions, said release member is coaxial with the motor shaft, said release member is a ring, and cam means for actuating said ring in axial movement to control the engagement and disengagement of said clutch, said ring being spring biased in clutch engaging direction, said means engaging said inclined surfaces is a disc shaped carrier having said ring mounted thereon on the side facing said follower member and having pin means engaging said inclined surfaces.

27. A motor driven chain saw according to claim 26 which includes an actuating lever connected to said carrier and protruding from said housing member.

28. A motor driven chain saw according to claim 27 in which the chain drive sprocket is between the saw motor and said housing member.

29. A motor driven chain saw according to claim 25 which includes a lever moveable into position to disengage said clutch, said lever when in clutch disengaging position being operable for actuating said brake member into braking position.

30. A motor driven chain saw according to claim 29 which includes a stationary wedge shaped surface for engagement with said brake member for moving the brake member in braking direction when actuated by said lever.

* * * * *